US012185144B1

(12) United States Patent
Hannák et al.

(10) Patent No.: US 12,185,144 B1
(45) Date of Patent: Dec. 31, 2024

(54) TRIGGER BASED DISTRIBUTED WIRELESS SIGNAL CAPTURE

(71) Applicant: Xtremis, Inc., Washington, DC (US)

(72) Inventors: Gábor Hannák, Washington, DC (US); Zoltán Dóczi, Washington, DC (US); Brian Christopher Padalino, Washington, DC (US); János Sallai, Washington, DC (US); Péter Horváth, Washington, DC (US); Adam Jay Harrison, Washington, DC (US); Miklós Maróti, Washington, DC (US); Péter Völgyesi, Washington, DC (US); Latarence Jarvis Butts, Washington, DC (US); Péter Barabás, Washington, DC (US); Sándor Szilvási, Washington, DC (US); Shane Van Wyngaardt, Washington, DC (US)

(73) Assignee: Xtremis, Inc., Washington, DC (US)

( * ) Notice: Subject to any disclaimer, the term of this patent is extended or adjusted under 35 U.S.C. 154(b) by 0 days.

(21) Appl. No.: 18/762,181

(22) Filed: Jul. 2, 2024

(51) Int. Cl.
H04W 24/08 (2009.01)
(52) U.S. Cl.
CPC .................. H04W 24/08 (2013.01)
(58) Field of Classification Search
CPC ..... H04L 43/045; H04L 41/145; H04L 41/22; H04W 24/08
See application file for complete search history.

(56) References Cited

U.S. PATENT DOCUMENTS 6,785,556 B2  8/2004  Souissi
7,286,835 B1  10/2007  Dietrich et al.
(Continued)

FOREIGN PATENT DOCUMENTS

CA      2556137 A1   2/2008
CN    201829167 U    5/2011
(Continued)

OTHER PUBLICATIONS

"Collecting and processing system of radio-frequency signals", Nov. 27, 2014. https://api.semanticscholar.org/CorpusID:65406063. Abstract Only.
(Continued)

Primary Examiner — Syed Ali
(74) Attorney, Agent, or Firm — Goodwin Procter LLP

(57) ABSTRACT

Disclosed are techniques and systems including a number of nodes operable to detect radio frequency signals within a radio frequency environment, and a central unit operable to communicate with each of the plurality of nodes. Each node is operable to receive a set of trigger conditions along with recording configurations, check the trigger conditions based on the sensed or measured signals in the radio frequency environment, determine that at least one of its trigger conditions to be true, and in response to determining that at least one of its trigger conditions is true, send a trigger to all other nodes of the plurality of nodes. The trigger indicates which of the trigger conditions is true. In-phase and Quadrature-phase data is recorded according to a recording configuration of received recording conditions, and the recorded IQ data is uploaded from each respective node to a central unit for further processing.

16 Claims, 4 Drawing Sheets

(56) References Cited

U.S. PATENT DOCUMENTS

| | | | |
|---|---|---|---|
| 7,433,696 | B2 | 10/2008 | Dietrich et al. |
| 8,098,590 | B2 | 1/2012 | Catovic et al. |
| 8,737,244 | B2 | 5/2014 | Rotvold et al. |
| 8,810,452 | B2 | 8/2014 | Bull |
| 8,891,716 | B2 | 11/2014 | Takahashi et al. |
| 8,989,762 | B1 * | 3/2015 | Negus .................. H04B 1/0475 |
| | | | 455/454 |
| 9,439,204 | B2 | 9/2016 | Kozaki et al. |
| 9,467,842 | B2 | 10/2016 | Pianese et al. |
| 9,473,954 | B2 | 10/2016 | Jiang et al. |
| 9,497,722 | B2 | 11/2016 | Husain et al. |
| 9,706,572 | B2 | 7/2017 | Bhushan et al. |
| 9,992,623 | B2 | 6/2018 | Skaaksrud |
| 10,660,060 | B1 | 5/2020 | Bilstad |
| 10,701,531 | B2 | 6/2020 | Agrawal et al. |
| 10,945,249 | B2 | 3/2021 | Lindoff et al. |
| 11,140,695 | B1 | 10/2021 | Eyuboglu |
| 11,166,222 | B2 | 11/2021 | Tarighat Mehrabani |
| 11,184,871 | B2 | 11/2021 | Paul et al. |
| 11,388,765 | B2 | 7/2022 | Plasterer et al. |
| 11,432,167 | B2 | 8/2022 | Lydecker et al. |
| 11,910,454 | B2 | 2/2024 | Raby et al. |
| 2007/0149139 | A1 | 6/2007 | Gauvreau |
| 2011/0185059 | A1 * | 7/2011 | Adnani .................. H04W 24/08 |
| | | | 709/224 |
| 2015/0382203 | A1 | 12/2015 | Kitsunezuka |
| 2017/0303138 | A1 * | 10/2017 | Barmettler ............ H04W 16/18 |
| 2021/0127284 | A1 * | 4/2021 | Abdelmonem ....... H04W 24/08 |
| 2023/0280454 | A1 | 9/2023 | Zorgui et al. |
| 2023/0352163 | A1 | 11/2023 | Cui et al. |
| 2024/0129751 | A1 * | 4/2024 | Belgiovine ........... H04W 16/28 |
| 2024/0137253 | A1 * | 4/2024 | Wu ..................... H04L 27/0012 |
| 2024/0179031 | A1 * | 5/2024 | Delfeld ................ H04B 7/0617 |
| 2024/0214931 | A1 * | 6/2024 | Huang ................ H04W 72/044 |
| 2024/0223344 | A1 * | 7/2024 | Huang ................. H04L 5/0073 |
| 2024/0284214 | A1 * | 8/2024 | Kleinbeck ............ H04W 24/10 |

FOREIGN PATENT DOCUMENTS

| | | |
|---|---|---|
| CN | 103052146 A | 4/2013 |
| CN | 104361375 A | 2/2015 |
| CN | 105868798 A | 8/2016 |
| CN | 113656490 A | 11/2021 |
| CN | 115484668 A | 12/2022 |
| EP | 3614717 A1 | 2/2020 |
| FR | 3085241 A1 | 2/2020 |
| TW | M568014 U | 10/2018 |
| WO | 2020039044 A1 | 2/2020 |
| WO | 2023274526 A1 | 1/2023 |
| WO | 2023281301 A1 | 1/2023 |
| WO | 202344205 A1 | 3/2023 |
| WO | 2023204739 A1 | 10/2023 |

OTHER PUBLICATIONS

Wen-jaun, X., et al., "Electromagnetic Spectrum Monitoring System Design and Analysis", Radio Engineering, 2012: 3 pages.

Bonna, K., et al., "Distributed RF Sensing Using Software-Defined Radios", 49th Annual Conference on Information Sciences and Systems (CISS), IEEE Xplore, p. 1-5, (2015).

Collotta, M., et al., "A Dynamic Algorithm to Improve Industrial Wireless Sensor Networks Management", IECON 2012—38th Annual Conference on IEEE Industrial Electronics Society, IEEE Xplore, p. 2802-2807, (2012).

Galkin, P., "Analysis Models of Collection Data in Wireless Sensor Networks", 2016 Third International Scientific-Practical Conference Problems of Infocommunications Science and Technology (PIC S&T), IEEE Xplore, p. 233-236, (2016).

* cited by examiner

TRIGGER BASED DISTRIBUTED WIRELESS SIGNAL CAPTURE

BACKGROUND

Wireless spectrum monitoring (WSM) in wireless communications refers to the equipment and processes which allow the wireless spectrum manager, user, or observer to obtain sufficient information on the radio spectrum to support a decision. WSM is typically performed on a confined geographical area (e.g., a city block, a designated rural area, or a single point), on a (set of) frequency band(s) (e.g., 800 MHZ-900 MHZ). The information obtained by WSM can refer to, for example: the received power in a frequency range, spectrum occupancy, i.e., the ratio of time when there is signal in a frequency range and the observation time, the signal-to-noise ratio (SNR) of a signal in the frequency range of that signal, the bandwidth and power of a signal, the noise floor in a frequency range, the modulation of a signal, or the like.

For advanced analytics use cases (e.g., localization, timing, and synchronization) and higher confidence results, local processing at the nodes is not sufficient and in cases, due to limitations, not feasible. Instead, data needs to be collected to a central location from all nodes and processed jointly. However, continuous collection of the data is practically infeasible: in distributed deployments, the nodes are connected only via wireless links (e.g., satellite, if there is no mobile network coverage), and the data rate is orders of magnitude larger than what the network link allows for. There is a need for a smarter way to enable advanced WSM use cases that are based on IQ recordings, but without continuous data collection. It is unfeasible to continuously record because the data set becomes too large.

Prior systems fail to reduce the amount of data to be transferred. An option to reduce the amount of data to be transferred to the central entity for processing is preprocessing at the nodes themselves. Such preprocessing may include: downsampling the IQ samples, removing irrelevant parts/sections or samples, compressing, and the like. The downsampling of the IQ samples to a lower sample rate comes with a trade-off between data rate gain and information content that may be considered when implementing different operational modes of the wireless RF monitoring system. Removal of irrelevant parts/sections/samples and keeping relevant parts/sections/samples eliminates the benefits of the distributed deployment, since the relevance of the IQ data derived from the IQ samples can only be judged during or after it has been jointly processed with IQ sample data from all nodes in the wireless RF monitoring system.

As for compression, continuous/on-the-fly compression at high data rates requires significant computational capacity from the nodes. This goes against principles and practical requirements of distributed, outdoor deployments, e.g., limited power usage, limited cooling capacity, compactness, mobility.

However, these choices for preprocessing have their deficiencies as noted. Better processes and systems for facilitating wireless spectrum monitoring over a larger area are needed.

BRIEF SUMMARY

Disclosed is a method for managing data recording in a wireless network, includes the steps of receiving a set of trigger conditions along with recording configurations by one or more nodes, continuously checking the trigger conditions by the one or more nodes in the wireless network based on the sensed or measured signals in a radio environment of the wireless network, determining at least one of its trigger conditions to be true by at least one node, sending a trigger to all other nodes, where the trigger indicates that a trigger condition of the trigger conditions has been met, recording In-phase and Quadrature-phase data by each respective node of the one or more nodes according to a recording configuration of the recording conditions received by the respective node, and uploading the recorded IQ data from each respective node to a central unit for further processing upon completion of recording and storage.

A wireless spectrum monitoring system, including a plurality of nodes operable to detect radio frequency signals within a radio frequency environment, and a central unit operable to communicate with each of the plurality of nodes. Each of the plurality of nodes is operable to receive a set of trigger conditions along with recording configurations from the central unit or another one of the plurality of nodes, check the trigger conditions based on the sensed or measured signals in the radio frequency environment, determine that at least one of its trigger conditions to be true, in response to determining that at least one of its trigger conditions is true, send a trigger to all other nodes of the plurality of nodes, wherein the trigger indicates which of the trigger conditions is true, record In-phase and Quadrature-phase data according to a recording configuration of received recording conditions, and upload the recorded IQ data from each respective node to a central unit for further processing.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
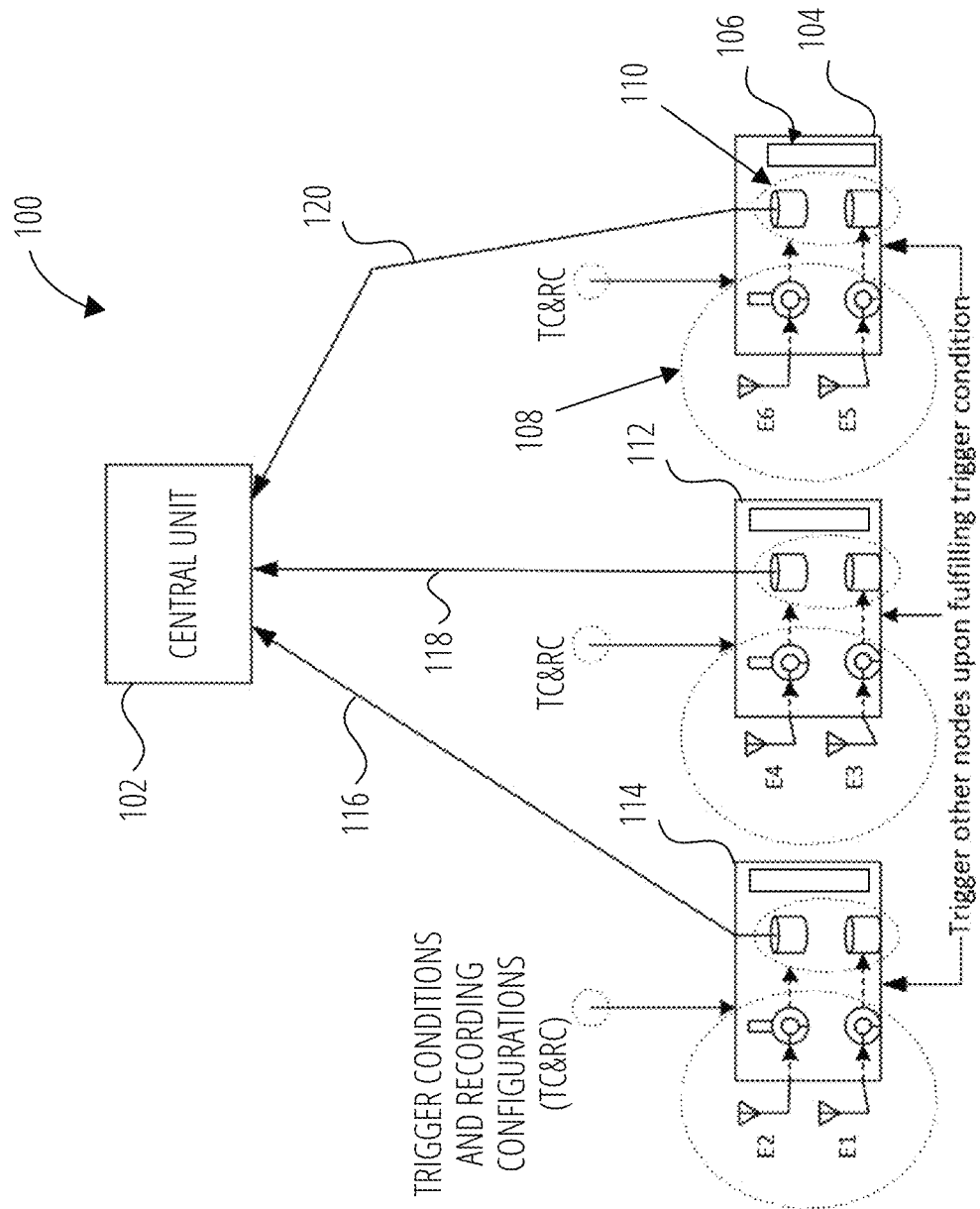
FIG. 1 illustrates an example of a wireless radio frequency monitoring system according to the disclosed subject matter.

For advanced analytics use cases (e.g., localization, timing, and synchronization) and higher confidence results, local processing at the nodes is not sufficient and in cases, due to limitations, not feasible. Instead, data needs to be collected to a central location from all nodes and processed jointly. However, continuous collection of the data is practically infeasible: in distributed deployments, the nodes are connected only via wireless links (e.g., satellite, if there is no mobile network coverage), and the data rate is orders of magnitude larger than what the network link allows for. There is a need for a smarter way to enable advanced WSM use cases that are based on IQ recordings, but without continuous data collection. Since it is unfeasible to continuously record as the data set becomes too large, a sub-selection criterion may be used for culling the data. For example, a sub-selection criterion may be the signal power in a frequency bin being monitored. An example analytics use case (such as to determine a location of an emitter, for example) may be an angle-of-arrival or a time-difference-of-arrival based emitter localization.

Wireless spectrum monitoring (WSM) in wireless communications may refer to the equipment and processes which allow the wireless spectrum manager, user, or observer to obtain sufficient information on the radio spectrum to support a decision.

As described in more detail below, the data recorded and stored by the nodes can be of multiple granularities (e.g., power per frequency, occupancy, etc.). Due to its rawness, the most comprehensive and informative data available at the nodes is the set of raw IQ samples. In one embodiment, IQ samples are a sequence of complex numbers which correspond to the In-phase (real part) and the Quadrature-phase (imaginary part) of the baseband digital signal. The sample rate is the number of samples per second. From the IQ samples it is possible to derive advanced analytics and intelligence about the radio environment, e.g.: derive the waveforms and modulation of a signal, obtain precise timing information of signals (sub-symbol level), obtain localization information by comparing the signal from a source at multiple locations/nodes, obtain timing information by comparing the signal from a source at multiple locations/nodes, and the like.

IQ sample data, in some examples, is processed locally and instantly due to its size because, for example, IQ recording at 10 MHz sample rate (typical for WSM applications) results in hundreds to thousands of megabytes per second.

A way to limit the amount of IQ sample data collected is to trigger time-synchronized recording, storing, and collecting of IQ samples in a distributed network of RF (radio frequency) sensing nodes. This addresses the issue of eliminating data because too much data is generated and cannot be adequately processed at the respective nodes or transmitted quickly and efficiently enough from the nodes to a platform capable of processing the amount of data being generated. Similarly, compression of the large amount of generated data takes additional computational power that also may not be provided for each node. Hence, the following provides an advantageous solution.

FIG. 1 illustrates an example of a wireless radio frequency (RF) monitoring system according to the disclosed subject matter. The wireless RF monitoring system 100 may include, for example, a central unit 102 and several nodes, such as node 104, node 112, and node 114.

Details of the nodes 104, 112, and 114 are described with reference to node 104. Node 104 may include processing/communication circuitry 106, an RF front end 108, and an IQ data storage 110. The RF front end 108 may be configured with multiple antennas, such as E5 and E6, tuned to receive signals in the radio frequencies being monitored. The processing/communication circuitry 106 may be operable to obtain IQ sample data from radio frequency signals received from the radio frequency (RF) front end 108.

In addition, the processing/communication circuitry 106 is operable to receive trigger conditions and recording configurations (TC & RC) transmitted by the central unit 102, another entity, such as node 112 or another node, by a user input via a user interface or computer interface, or the like.

Each respective node 104, 112 and 114 is operable to establish a respective communication link with the central unit 102, either in response to a signal received from the central unit 102 or by sending a communication request to the central unit 102. For example, node 114 is operable to establish communication link 116, node 112 is operable to establish communication link 118, and node 104 is operable to establish communication link 120.

Each node may include IQ data storage 110 as shown in node 104. In an example, the processing/communication circuitry 106 may be operable to store IQ data in the IQ data storage 110 after processing received IQ sample data. In other examples, the IQ sample data may be stored directly in the IQ data storage 110 and be transmitted to a central unit 102 for processing.

Additionally, each of the nodes 104, 112 and 114 is capable of sensing the wireless spectrum in a frequency range defined by its hardware and software capabilities. For example, each node may have one or more frontends (RF chains), such as 108. The RF front end 108 may be an independent sensing unit (i.e., capable of sensing different frequencies with different bandwidths) that is controlled by the respective processing/communication circuitries, such as 106 of node 104. For example, the RF front end 108 may include antennas, such as E5 and E6 operable to receive signals in the frequency range of 0-18 GHz that are transmitted by emitters (shown in a later example). Frontends of the nodes 112 and 114 also include antennas, such as E1 and E2, and E3 and E4, respectfully, that may also be configured to detect signals in the radio frequency (RF) range of 0 Hz-18 GHz. In an embodiment, the radio environment considered may be the RF range of 0 Hz-18 GHZ. In other embodiments, the radio environment may be considered a narrower RF range, such as 800-900 MHZ, or the like.

In some examples, the nodes continuously record IQ samples from their frontends into memories, such as a node's respective IQ data storage 110. The IQ data storage 110 may, for example, be implemented using separate ring buffers (not shown) of length N (corresponding to time T), or the like.

Each of the respective nodes' internal hardware clocks (including the internal hardware clock of the central unit 102) are synchronized with each other, e.g., via GPS clock, or a reference radio signal (e.g., DVB-T digital video broadcasting by terrestrial an EU standard) with known node and source locations). Therefore, each of the nodes is capable of timestamping its captured IQ samples with sample-accuracy.

In an embodiment, the central unit 102 is equipped with the necessary network, storage, and processing capabilities to collect IQ data from all RF sensing nodes (i.e., nodes 104, 112, and 114), store and process the respective IQ data.

In the example of FIG. 1, the central unit 102 is shown as an independent device that communicates with respective nodes 104, 112, and 114 of the wireless RF monitoring system 100. However, in other examples, the central unit 102 may function as an RF sensing node similar to nodes 104, 112, or 114. In another alternative, the central unit 102 may be collocated with one of the nodes 104, 112, or 114. While three nodes are shown in the example of FIG. 1, it is envisioned that the number of nodes may be greater than 3, for example, the number of nodes may be in the 10s, 20s, 30s, 100s or even 1000s.

In an operational example for monitoring radio frequency spectrum usage by the wireless RF monitoring system 100, one or more nodes, such as node 104 or nodes 104, 112 and 114 or some other combination, may receive a set of trigger conditions related to radio frequency spectrum of interest. In addition, in some examples, recording configurations are received with the set of trigger conditions by the one or more nodes. The recording configurations indicate different storage parameters for IQ data obtained from the IQ samples of the signals in the radio frequency spectrum of interest.

When IQ data is obtained by the respective node based on the sensed or measured signals in a radio environment of the wireless network, the processing/communication circuitry 106 may be operable to evaluate the IQ data against the respective node's trigger conditions by the one or more nodes in the wireless network. In some examples, the processing/communication circuitry 106 is operable to determine at least one of its trigger conditions to be true by at least one node. In response to the "trigger," the respective node sends the trigger (i.e., a signal indicating which particular trigger of the trigger conditions was detected) to all the other nodes in the wireless network. The trigger indicates that a trigger condition of the trigger conditions has been met, the node and the other nodes continue or begin recording IQ data, with each respective node of the one or more nodes recording and storing the IQ data according to a recording configuration of each respective node, and uploading the recorded IQ data from each respective node to a central unit for further processing upon completion of recording and storage.

In an example, when the processing/communication circuitry 106 of each respective node is determining whether at least one of its trigger conditions to be true by the respective node, a processor of the respective node may use the respective triggering conditions to check if a received signal has met one or more of the node's respective trigger conditions.

The advantages provided by the disclosed wireless RF monitoring system 100 and the techniques described herein include at least sample-accurate, synchronous IQ sample recording from multiple locations and devices, and recording of the radio environment even if the signal is below detection threshold at some nodes by not another node, which enables advanced use cases (e.g., localization, RF channel/environment modeling, or the like).

Figure 2:
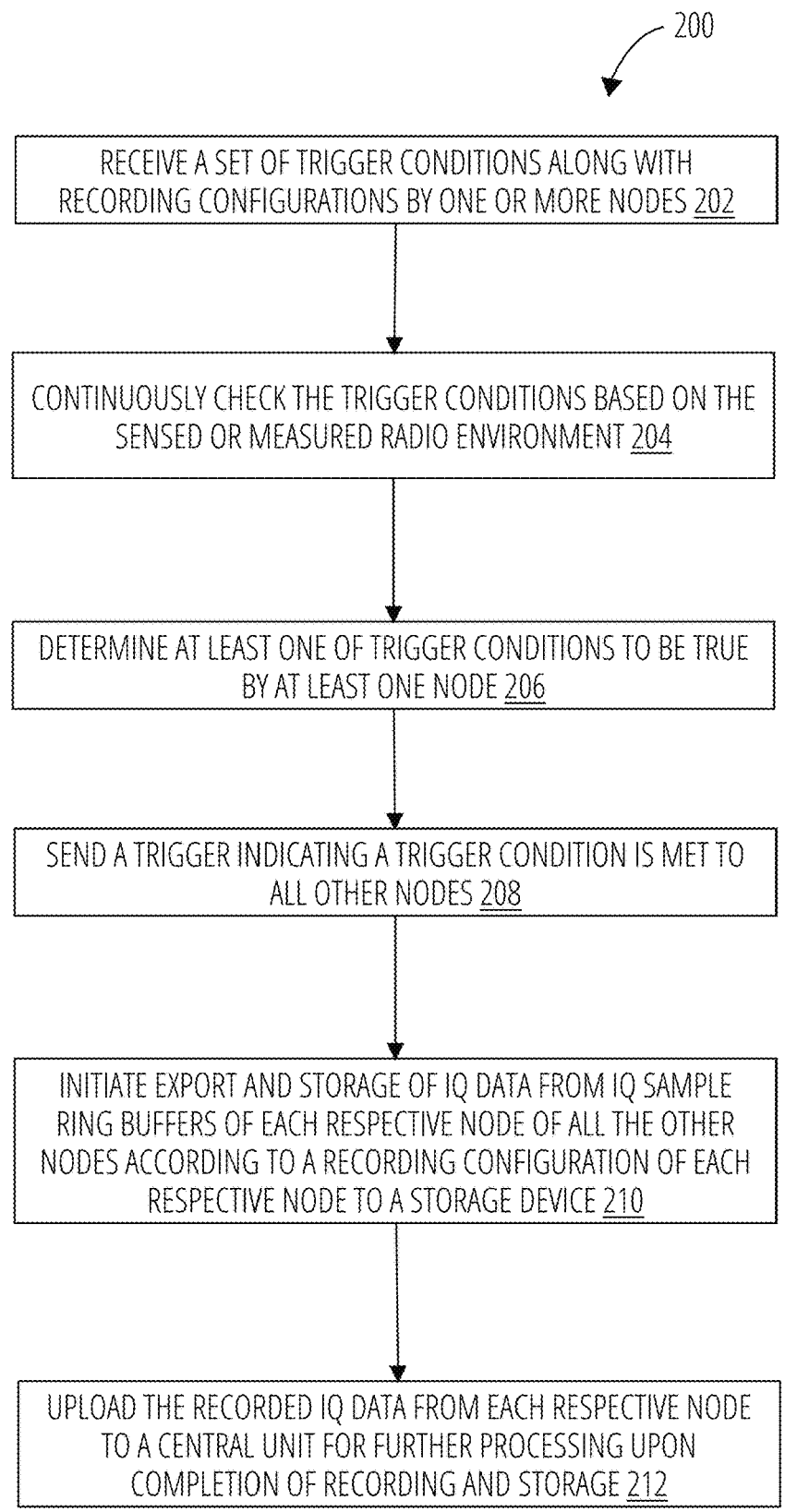
FIG. 2 illustrates an exemplary process for managing data recording in a wireless network in accordance with an embodiment.

FIG. 2 illustrates an exemplary process for managing data recording in a wireless network in accordance with an embodiment.

The operational example discussed with reference to FIG. 1 is a high level example of the process executed by one or more of the nodes of the wireless RF monitoring system 100. The process 200 includes at least the following steps:

In block 202, a processor executing the process 200 may receive a set of trigger conditions along with recording configurations by one or more nodes. The set of trigger conditions along with recording configurations may come from the central unit (e.g., Option 1), a node-internal mechanism (e.g., Option 2), via manual configuration (e.g., Option 3), from another node (e.g., Option 4), or the like. The set of trigger conditions may include one or more "triggers." A trigger is a threshold signal-related value for one or more radio frequency signals in a radio frequency spectrum of interest in the radio environment being monitored by the wireless RF monitoring system 100.

The set of trigger conditions and/or recording settings are instantiated at one or more of the nodes: A trigger condition refers to a state or a combination of states (combined with the logical operators and, or, not) on the measurements and derived values that the node performs, and when the trigger condition is TRUE, the trigger condition is activated or "triggered." Examples of measurements and derived values that may be used for a trigger condition include at least one or more of: a presence of a signal at a frequency or within a frequency range, a center frequency of a signal, min/max bandwidth of a detected signal in a frequency band, a power of a detected signal (e.g., in dBFS or dBm or dBW), a modulation of a detected signal, a signal-to-noise ratio (SNR) of a detected signal, a duration of a detected signal, timestamp, and the like. The trigger condition may have one or more of these measurements and/or derived values as trigger condition parameters, and each of the respective trigger condition parameters may have threshold values (i.e., trigger threshold signal-related values). The trigger condition is triggered when the trigger threshold signal-related value is met and/or exceeded (i.e., is TRUE).

Trigger conditions and sets of trigger conditions may include parameters that may be conditions on time and location as well, e.g.:

"between 22:30:00-06:00:00 UTC"

"if time before 2024 May 1 00:00:00 UTC". "if location within [area described by set of GPS coordinates]," which may become relevant if a node is mobile/moving; or "if node is static (not moving)."

A recording configuration describes the details of what IQ samples to store in a memory upon a trigger and how. Multiple recording configurations may be hosted at nodes. The recording configuration may contain parameters such as:

File format, e.g., SigMF,

Data type for IQ samples (e.g., complex, or real, float, 16/32/64 bit),

Start time of recording, which may be earlier than the time of the trigger, in which case past values from the memory are added to the recording, Duration/length of recording in time or number of samples or end time of recording, Sampling rate, Configurations related to post-processing after the recording has finished, e.g., subsequent compression, maximum file size, subsampling, filtering (e.g., frequency filtering), additional file formatting, and Metadata to store alongside the recording.

The metadata to be stored with the recording may include additional information such as:

Trigger identification (e.g., a globally unique ID), as the trigger may have come from another node, Identification information of the respective node and, for the respective node, a frontend identification (note that each respective node may include one or more frontends), Location information, e.g., GPS coordinates, altitude, and the like, of the respective node, and Hardware configuration values of the respective node at the time of recording, e.g., calibration values, gain values of amplifiers.

In some scenarios, there may be a default recording configuration for every node, which may be as simple as exporting the IQ data from the memory to the storage in the native format of the IQ data and naming the file such that it contains an exact date and time. If there are multiple recording configurations to use, an operator or a central entity (e.g., the central unit) may ensure that if a trigger condition with a specific recording configuration is deployed, then that very recording configuration is also available at the given node (i.e., a trigger condition cannot try to activate a non-existing recording configuration). Also, in an example, the node is not responsible for selecting a recording configuration, but simply associates a trigger with a recording configuration, the latter being assumed to be available.

A trigger identification may be generated in a number of different manners, such as random number generators, preset alphanumeric names, or the like. In an example, the trigger identification may be generated based on relevant trigger condition parameters of the trigger condition. For example, a processor in the node may be operable to use the trigger condition parameters discussed above when generating the trigger identification. The processor may, for example, obtain a number (e.g., one, some, or all) of trigger condition parameters from a list of relevant trigger condition parameters and hash them into a data object (which may be the trigger condition identification unique identifier itself), e.g., the center frequency, bandwidth, power/SNR of signal, modulation of detected signal, duration of detected signal, timestamp, or the like. The processor causes the generated trigger condition identification (i.e., the data object) to be distributed to the other nodes. In this example, the nodes are able to determine if: 1) the other nodes have simultaneously created a trigger due to the same event (and already started creating the associated recording), in which case the other nodes do not instantiate a new recording; and 2) the other nodes do not create (or cancel, if have created) a trigger due to the same event, and instead begin recording based on the received trigger condition identification. While a hash function was described, other functions or operations (e.g., encryption schemes or the like) may be used to generate the unique identifier of the trigger condition identification.

The respective trigger conditions may include an indication of which recording configuration to use if multiple recording configurations are available. For example, a respective trigger condition may have all of the parameters listed above, or depending upon the capabilities (e.g., improved processor, transceiver, or memory capabilities) of the node, or the conditions of the node, such as an amount of signal interference in the node radio environment, node location, or the like), the processor may have the option to select to record the IQ data using fewer recording configuration parameters depending upon the node capabilities or conditions.

In more detail, instantiation of the trigger conditions/recording settings at block 202 may be achieved in at least one of the following ways:
- the central unit transfers them to the relevant nodes via their network connection,
- a node-internal mechanism creates them within the node,
- manual configuration of the node via the node's user interface (command line, graphical, local, or remote (e.g., SSH, etc.)),
- a node transfers them to the relevant nodes directly or via the central unit, or
- the like.

In an example, a node-internal mechanism may be controlled by the processing/communication circuitry 106 and be operable to utilize typical signal thresholds for different types or kinds of signals of interest in the radio environment.

The network may be an ad-hoc network and the communication protocols may be a broadcast, multicast, all-to-one, one-to-all, point-to-point, or the like. The described subject matter is agnostic to the nature of the network connection. The network connection may be an IP network over any physical layer such as satellite, commercial mobile network, microwave link, fiber, ethernet, or the like.

Trigger conditions might have a unique identifier in order to make future searching and processing feasible, and in order to identify IQ recordings that came to be because of the same trigger.

Returning to FIG. 2, in block 204, the respective node executing the process 200 may, for example, be continuously checking the trigger conditions by the nodes based on the sensed or measured radio environment. "Continuously" may refer to a time interval that the node monitors signals received at the node. A continuous time interval may be substantially real time or tenths of milliseconds. Alternatively, an interval of the checking may, for example, be continuous, at short intervals, every 20 milliseconds for a preset duration, such as 20 milliseconds, 30 milliseconds, or the like, longer intervals, every 2 seconds for a preset duration, such as 20 milliseconds, 30 milliseconds, 2 seconds, or the like. The node processor, such as processing/communication circuitry 106, continuously checks by receiving signals within the wireless RF spectrum of interest (e.g., the radio environment) and based on the received signals is operable to determine in-phase (I) and quadrature-phase (Q) components that is two amplitude-modulated sinusoids that are in quadrature phase that represent a modulated (sinusoidal) signal (i.e., IQ data).

In block 206, as each of the nodes that implement the process 200 evaluates received signals against their respective trigger conditions, at least one node of the number of nodes in the wireless RF monitoring system 100 may determine at least one of its trigger conditions to be true. In response to determining at least one of its trigger conditions to be true, the respective node, at block 208, may send a trigger to all other nodes. The trigger indicates that the trigger condition is met. The node sending the trigger to all the other nodes, may transmit the trigger to the central unit 102, which is configured to broadcast the sent trigger to all other nodes in the wireless RF monitoring system 100.

In response to receipt of the trigger, the respective nodes will start recording signals in the radio environment that meet the trigger condition indicated by the trigger. At block 210, the respective nodes according to process 200 initiate export of IQ data from IQ sample ring buffers of each respective node of all the other nodes, where the IQ data was stored according to a recording configuration of each respective node for the triggered trigger condition. The IQ data may be stored in the IQ sample ring buffers according to their recording configuration.

In block 212, process 200 uploads the recorded IQ data from each respective node to a central unit for further processing upon completion of recording and storage.5. Each node, when recording and storing is finished, will upload this recorded IQ data to the central unit for further processing.

Every node which has at least one trigger condition, continues to check whether a new trigger based on the other conditions, which have not yet triggered, is true or false. If at least one of the other trigger conditions becomes true and a new trigger (signal) is to be generated, the processing/communication circuitry 106 repeats the process 200 and notifies the other nodes by sending the new trigger, alongside with the unique trigger identifier. Hence, the process 200 may permit multiple trigger conditions to exist at once.

As in block 210 and block 212, the respective nodes activate the recording configuration associated with the new triggers and begin to record and create the files associated with the respective IQ data associated with the new trigger condition. In such an example, multiple conditions may switch from false to true at the same time, or during an ongoing recording a new condition may become true (or a triggered condition may become false). For example, nodes may be configured to allow only a maximum number of simultaneous recordings (e.g., due to computational limitations), or trigger conditions may be configured to be exclusive (i.e., when an associated recording is ongoing, no other trigger can be activated) or non-exclusive. If the recording configuration (or the one associated with the activated trigger if there are multiple recording configurations) indicates that the start of the recording is in the past, IQ data from the node's ring buffer may be used to complete the recording. In some instances, the indicated start time may have passed longer than the memory of the ring buffer, in such an instance the recording may be incomplete and the processing/communication circuitry 106 completes the recording on a best effort basis.

Each recording culminates in a number of files on the node's file system of its storage unit, e.g., binary files, protobuf (protocol buffers) files, SigMF files, binary files, tabular files (CSV, raw text file), data arrays as defined by common programming languages (e.g., Python NumPy array, Pandas array, list). Metadata may be generated in conjunction with the recording of the IQ data. For the metadata, potentially separate files are generated, which may be text files in JSON, XML, YAML, or common text format. These files are transferred to the central unit and/or directly to the cloud for further processing via the network.

Figure 3:
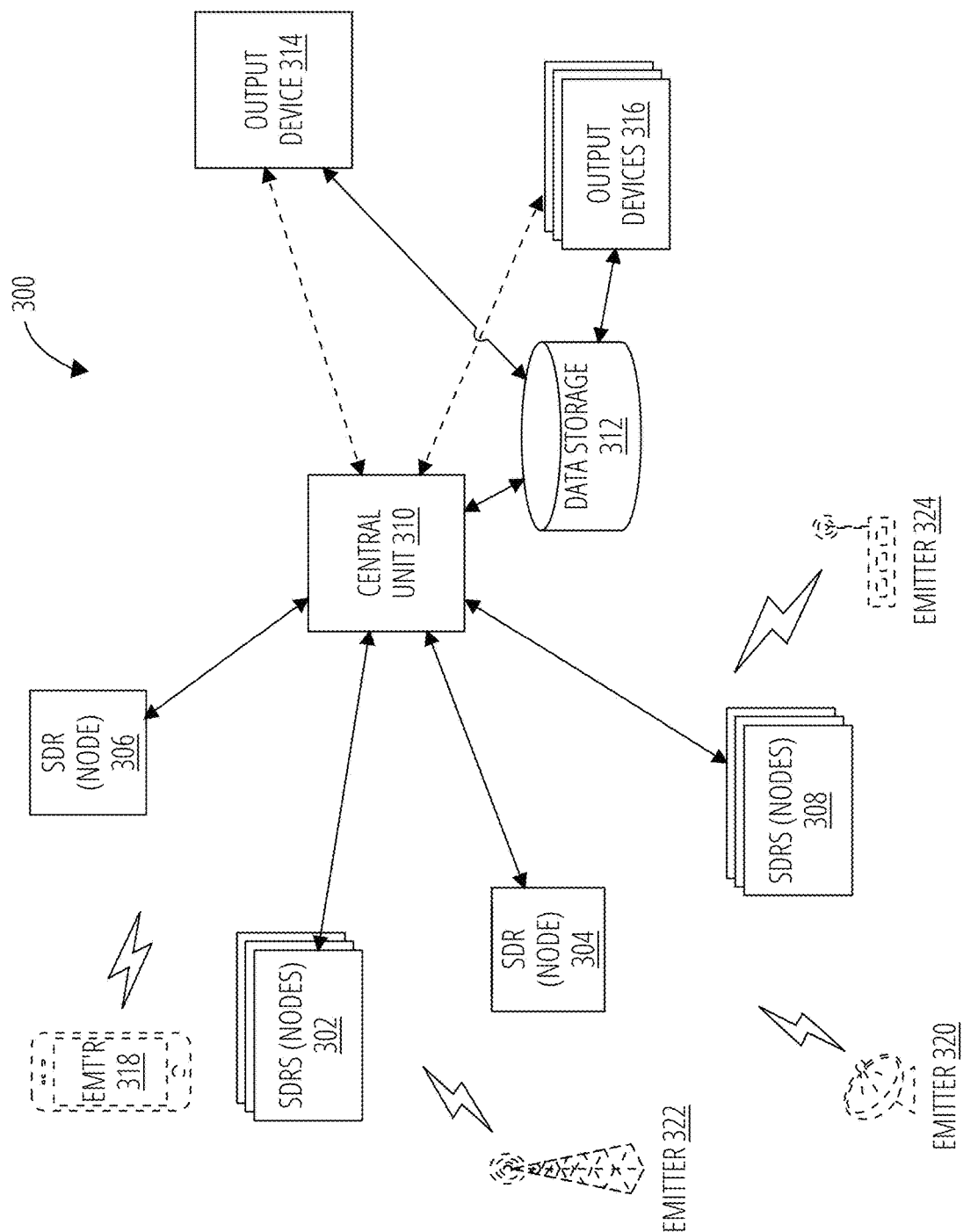
FIG. 3 illustrates a block diagram of an example of a wireless spectrum monitoring system according to the disclosed subject matter.

FIG. 3 illustrates an example of a wireless spectrum monitoring system according to the disclosed subject matter.

The wireless spectrum monitoring system 300 may include a number of radio frequency nodes distributed over a geographical area of interest. For example, the radio frequency nodes of the wireless spectrum monitoring system 300 may be a number of software defined radios 302, 304, and 306 (also referred interchangeably herein as "nodes"). Other components of the wireless monitoring system may include a central unit 310, a data storage 312, and output devices 314 and 316.

The wireless spectrum monitoring system 300 is operable to monitor signals output by a number of emitters 318, 320, 322, and 324. The number of emitters 318, 320, 322, and 324 may be operable to transmit signals in the RF range of 0-18 GHZ. Of course, the emitters and the wireless spectrum monitoring system 300 may be operable to operate in a radio environment where the RF range of signals is 0 Hz-18 GHz, or includes a broader range of signals, such as signals in the higher GHz range, or a smaller range of signals such as 800-900 MHz, or the like.

The software defined radios 302, 304, 306 and 308 are custom software defined radios (SDRs) that are respective nodes within the wireless spectrum monitoring system 300. The software defined radios 302 and 308 represent a number of SDRs that provide data regarding the 0 Hz-18 GHz signals generated by the emitters 118-124 to the central unit 310.

The central unit 310 may also be an SDR configured in a manner like the SDRs 302, 304, 306, and 308. As described with reference to later examples, the respective SDRs 302, 304, 306, and 308 may include processors (e.g., hardware, software, radio frequency receivers and transmitters, and the like) operable to send signal data (e.g., processed signal data, raw signal data, or a combination of both) to the central unit 310. The central unit 310 may be operable to store the received signal data in the data storage 312. The central unit 310 may be operable to perform the functions described herein with reference to the described examples.

The data storage 312 may be a memory device or a server that is accessible by the output devices 314 and 316. The output device 314 may be a console or computer at a location remote from the central unit 310. Similarly, the output devices 316 may be computers or consoles that are also remote from the central unit 310 or may be co-located with the central unit 310.

The output devices 314 and 316 are operable to access signal data processed according to the later described examples. In an example, the output devices 314 and 316 may be workstations coupled either via wired or wireless connections to the central unit 310 or may be tablets or computers communicatively coupled to the 310 or the data storage 312. The output devices 314 or 316 may be operable to execute a computer application that configures the respective output device to present the processed signal data in an easily-understood format.

Figure 4:
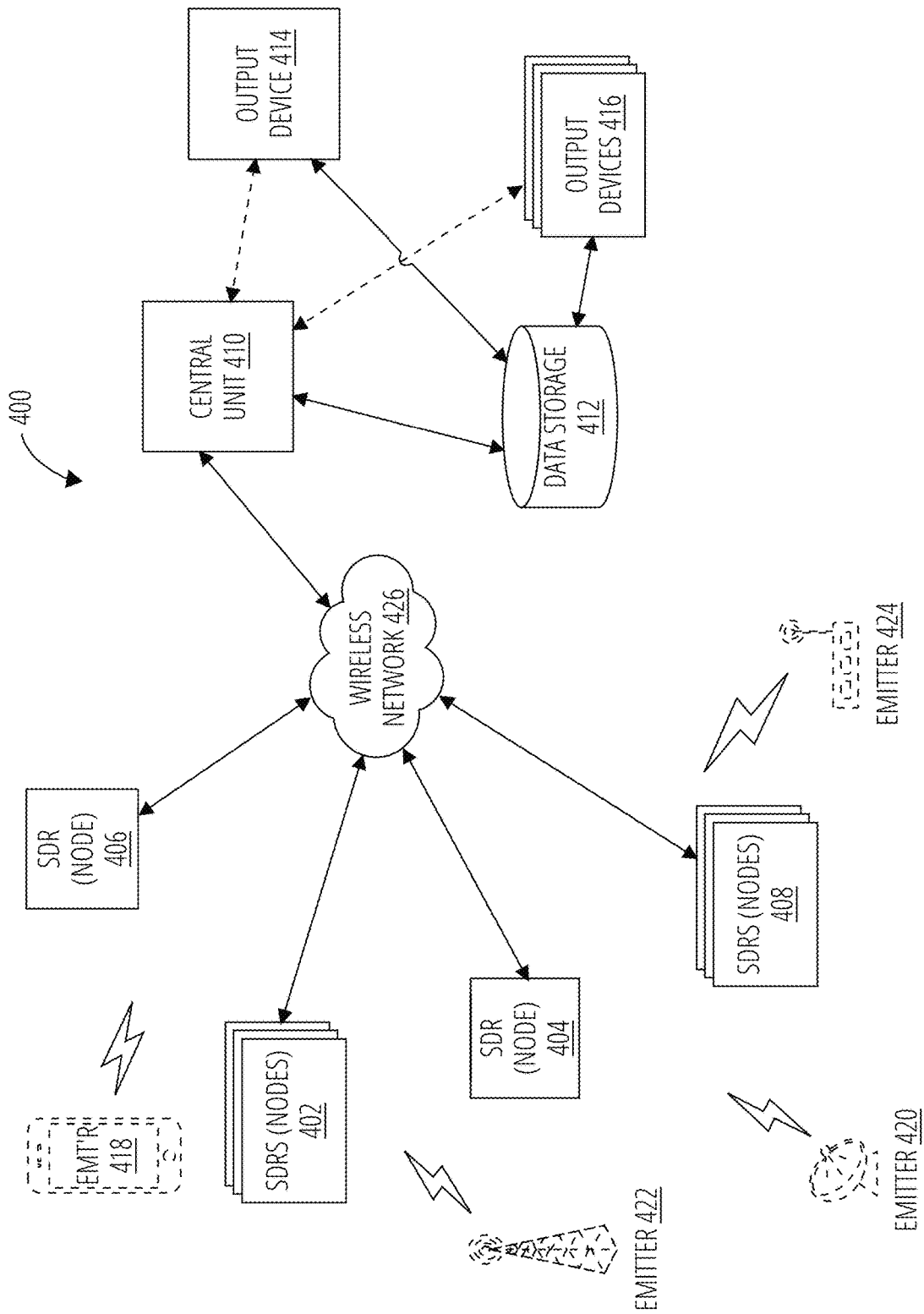
FIG. 4 illustrates a block diagram of an example of a wireless spectrum monitoring system according to the disclosed subject matter.

FIG. 4 illustrates another example of a wireless spectrum monitoring system according to the disclosed subject matter.

The wireless spectrum monitoring system 400 comprises a software defined radios 402, a software defined radio 404, a software defined radio 406, a software defined radios 408, a central unit 410, a data storage 412, an output device 414, an output devices 416, an emitter 418, an emitter 420, an emitter 422, an emitter 424, and a wireless network 426.

The wireless network 426 be an intermediary between the central unit and the RF sensing nodes. This may be any IP network over a wired network, a mobile network (for example, of a commercially available communications service provider (e.g., a cellular network), or private provider), or satellite communications service provider, a set of dedicated communication links (e.g., microwave links or the like), or the like. In some examples, the dedicated communication links of the wireless radio frequency links may be of a different radio frequency than the radio frequency spectrum being monitored by the wireless RF monitoring system 100. In other examples, the dedicated communication links of the wireless radio frequency links may be within the radio frequency spectrum being monitored.

The wireless spectrum monitoring system 400 may be implemented as a data acquisition platform including a plurality of radio frequency nodes distributed over a geographical area of interest. For example, the wireless spectrum monitoring system 400 may include a number of software defined radios 402, 404, and 406 (also referred interchangeably herein as "nodes"), a central unit 410, a data storage 412, and output devices 414 and 416.

The wireless spectrum monitoring system 400 is operable to monitor signals output by a number of emitters 418, 420, 422, and 424. The number of emitters 418, 420, 422, and 424 may be operable to transmit signals in the range of 0-18 GHZ.

The software defined radios 402, 404, 406 and 408 are custom software defined radios (SDRs) that are respective nodes within the wireless spectrum monitoring system 400. The software defined radios 402 and 408 represent a number of SDRs that provide data regarding the 0 Hz-18 GHz signals generated by the emitters 118-124 to the central unit 410.

In some examples, the central unit 410 is a software defined radio (SDR) configured in a manner like the SDRs 402, 404, 406, and 408. As described with reference to later examples, the respective SDRs 402, 404, 406, and 408 may include processors (e.g., hardware, software, radio frequency receivers and transmitters, and the like) operable to send signal data (e.g., processed signal data, raw signal data, or a combination of both) to the central unit 410. The central unit 410 may be operable to store the received signal data in the data storage 412. The central unit 410 may be operable to perform the functions described herein with reference to the described examples.

The data storage 412 may be a memory device or a server that is accessible by the output devices 414 and 416. The output device 414 may be a console or computer at a location remote from the central unit 410. Similarly, the output devices 416 may be computers or consoles that are also remote from the central unit 410 or may be co-located with the central unit 410.

The output devices 414 and 416 are operable to access signal data processed according to the later described examples. In an example, the output devices 414 and 416 may be workstations coupled either via wired or wireless connections to the central unit 410 or may be tablets or computers communicatively coupled to the 410 or the data storage 412. The output devices 414 or 416 may be operable to execute a computer application that configures the respective output device to present the processed signal data in an easily-understood format, as described with respect to later examples.

The respective nodes, such as node 104, node 112 and node 114 may be software-defined radios (SDR). An SDR is a radio communication system where components that conventionally have been implemented in analog hardware (e.g., mixers, filters, amplifiers, modulators/demodulators, detectors, etc.) are instead implemented by means of software on a computer or embedded system. While the concept of SDR is not new, the rapidly evolving capabilities of digital electronics render practical many processes which were once only theoretically possible.

A basic SDR system may include a computer equipped with a sound card, or other analog-to-digital converter, preceded by some form of RF front end. Significant amounts of signal processing are handed over to the general-purpose processor, rather than being done in special-purpose hardware (electronic circuits). Such a design produces a radio which can receive and transmit widely different radio protocols (sometimes referred to as waveforms) based solely on the software used.

Software radios have significant utility for the military and cell phone services, both of which must serve a wide variety of changing radio protocols in real time. In the long term, proponents expect software-defined radios to become the dominant technology in radio communications. SDRs, along with software defined antennas are the enablers of cognitive radio.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Indeed, the terms "processor," "controller," and the like, are generally used interchangeably herein, and refer to any of the above devices and systems, as well as any data processor.

While this specification contains many specific implementation details, these should not be construed as limitations on the scope of any disclosed subject matters or of what may be claimed, but rather as descriptions of features specific to particular implementations of particular disclosed subject matters. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations. Furthermore, it should be understood that the described program components and systems may, optionally, be integrated together in a single software product or packaged into multiple software products.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips, FPGAs), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing data recording in a wireless network, comprising the steps of:
    receiving a set of trigger conditions with recording configurations by one or more nodes, wherein each trigger condition in the set of the trigger conditions includes a unique identifier and an indication of a recording configuration to use when multiple recording configurations are available;
    continuously checking the trigger conditions by the one or more nodes in the wireless network based on the sensed or measured signals in a radio environment of the wireless network;
    determining at least one of its trigger conditions to be true by at least one node;
    sending a trigger to all other nodes, wherein the trigger indicates that a trigger condition of the trigger conditions has been met;
    recording In-phase/Quadrature-phase (IQ) data by each respective node of the one or more nodes according to a recording configuration of the recording conditions received by the respective node;
    identifying IQ recordings generated in response to triggering of the same trigger condition; and
    uploading the recorded IQ data from each respective node to a central unit for further processing upon completion of recording and storage.

2. The method of claim 1, wherein checking the trigger conditions based on the sensed or measured radio environment further comprises:
    processing the sensed or measured signals from the radio environment of the wireless network;
    evaluating the processed, sensed or measured signals with respect to one or more of:
    presence of a signal at a frequency or within a frequency range,
    bandwidth of a detected signal in a frequency band,
    power of a detected signal,
    modulation of a detected signal,
    signal-to-noise ratio (SNR) of a detected signal, or
    duration of a detected signal.

3. The method of claim 1, wherein each trigger condition in the set of the trigger conditions includes conditions on time and location.

4. The method of claim 1, wherein the recording configuration sets details of which In-phase and Quadrature-phase components to store upon triggering of a trigger condition.

5. The method of claim 1, wherein the recording configuration includes one or more of:
    a file format for recorded In-phase and Quadrature-phase data,
    a data type for samples of In-phase and Quadrature-phase data,
    a start time of recording,
    a duration or length of recording in time or number of samples or end time of recording,
    a sampling rate,
    a configuration related to post-processing after the recording has finished, or
    metadata to store alongside a recording.

6. The method of claim 5, wherein metadata to store alongside the recording includes one or more of:
    trigger identification,
    a node and/or frontend identification,
    a location information of node, or
    a hardware configuration values at the time of recording.

7. The method of claim 1, wherein the trigger conditions and recording configurations are received from at least one of the following sources:
    a central unit,
    a node-internal mechanism,
    a manual configuration, or
    another node.

8. The method of claim 7, wherein an indication of the triggering of the trigger condition is sent by the respective node to all other nodes via the central unit.

9. The method of claim 1, wherein the triggered trigger condition is a first trigger condition; and
    the method further comprising:
    while recording in response to triggering of the first trigger condition, determining that a second trigger condition is triggered;
    in response to triggering of the second trigger condition, evaluating the recording configuration for the first trigger condition and a recording configuration for the second trigger condition;
    determining whether the respective recording configurations permits simultaneous recordings; and
    in response to a determination simultaneous recordings are permitted, beginning recording In-phase and Quadrature-phase data according to the recording configuration for the second trigger condition and continuing recording In-phase and Quadrature-phase data according to the recording configuration for the first trigger condition, or
    in response to a determination simultaneous recordings are not permitted due to an exclusive recording configuration for either the first trigger condition or the second trigger condition, beginning recording In-phase and Quadrature-phase data according to the recording configuration for the second trigger condition and continuing recording In-phase and Quadrature-phase data according to the recording configuration for the first trigger condition.

10. The method of claim 1, further comprising:
    storing In-phase and Quadrature-phase data in IQ sample ring buffers and exporting the stored In-phase and Quadrature-phase data to a central node of the one or more nodes.

11. A wireless spectrum monitoring system, comprising:
    a plurality of nodes operable to detect radio frequency signals within a radio frequency environment; and a central unit operable to communicate with each of the plurality of nodes, wherein each node of the plurality of nodes is operable to:
  receive a set of trigger conditions along with recording configurations from the central unit or another one of the plurality of nodes, wherein each trigger condition in the set of the trigger conditions includes a unique identifier and an indication of a recording configuration to use when multiple recording configurations are available,
  check the trigger conditions based on the sensed or measured signals in the radio frequency environment,
  determine that at least one of its trigger conditions to be true,
  in response to determining that at least one of its trigger conditions is true, send a trigger to all other nodes of the plurality of nodes, wherein the trigger indicates which of the trigger conditions is true,
  record In-phase and Quadrature-phase (IQ) data according to a recording configuration of received recording conditions,
  identify IQ recordings generated in response to triggering of the same trigger condition; and
  upload the recorded IQ data from each respective node to a central unit for further processing.

12. The wireless spectrum monitoring system of claim 11, wherein uploading of the recorded IQ data is done upon completion of recording and storage of the recorded IQ data.

13. The wireless spectrum monitoring system of claim 11, wherein the recording configuration sets details of which In-phase and Quadrature-phase components to store upon triggering of a trigger condition.

14. The wireless spectrum monitoring system of claim 11, wherein the recording configuration includes one or more of:
  a file format for recorded IQ data,
  a data type for samples of IQ data,
  a start time of recording,
  a duration or length of recording in time or number of samples or end time of recording,
  a sampling rate,
  a configuration related to post-processing after the recording has finished, or
  metadata to store alongside a recording.

15. The wireless spectrum monitoring system of claim 11, wherein when checking the trigger conditions based on the sensed or measured radio environment each node of the plurality of nodes is further operable to:
  process the sensed or measured signals from the radio environment of the wireless network;
  evaluate the processed sensed or measured signals with respect to one or more of:
  presence of a signal at a frequency or within a frequency range,
  bandwidth of a detected signal in a frequency band,
  power of a detected signal,
  modulation of a detected signal,
  signal-to-noise ratio (SNR) of a detected signal, or
  duration of a detected signal.

16. The wireless spectrum monitoring system of claim 11, wherein each node of the plurality of nodes is operable to:
  identify In-phase and Quadrature-phase recordings generated in response to triggering of the same trigger condition.

* * * * *